United States Patent Office 3,299,094
Patented Jan. 17, 1967

3,299,094
ESTERS, AMIDES, AND IMIDES OF OCTACHLORO-3,6 - METHANO-1,2,3,6-TETRAHYDROPHTHALIC ANHYDRIDE
Edward D. Weil, Lewiston, N.Y., assignor to Hooker Chemical Corporation, Niagara Falls, N.Y., a corporation of New York
No Drawing. Filed Aug. 2, 1965, Ser. No. 476,678
11 Claims. (Cl. 260—326)

This is a continuation-in-part of my application Serial No. 116,253, filed June 12, 1961, now United States Patent No. 3,198,811.

This invention describes novel tricyclic perchlorinated compositions of matter useful as organic intermediates and herbicides.

More particularly, this invention describes octachloro-3,6-methano-1,2,3,6-tetrahydrophthalic anhydride and related derivatives of the structure:

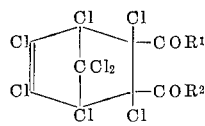

wherein $R^1$ and $R^2$, which may be the same or different, are members selected from the group consisting of hydroxy, amino, alkoxy, aryloxy, alkylamino and dialkylamino, providing that no more than one of $R^1$ and $R^2$ may be OH, and $R^1$ and $R^2$ when conjoined to form a ring are members of the group consisting of imino, alkylimino, hydroxyimino, alkylmercaptoimino, and thia (—S—). The alkyl and aryl moieties are generally of 1 to 12 and 6 to 18 carbon atoms, respectively, preferably of 1 to 6 and 6 to 10 carbon atoms, respectively. Thus, the alkyls may be characterized as lower alkyls whether alone or in combined form, as in alkoxy, and the aryls are primarily monocyclic or phenyl, or phenyl substituted with lower alkyl. These derivatives may be made by well known and routine synthetic procedures involving one step or multi-step reactions well known to the art and common to anhydrides generally. More detailed examples of some of the compositions formed, as well as the reactants used, appear in a more detailed form elsewhere in this application.

The anhydride is prepared by the reaction represented below:

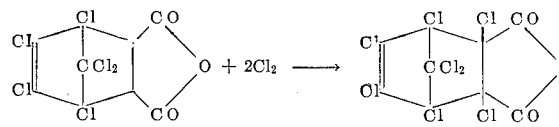

The starting material for preparing the anhydride is 3,4,5,6,7,7 - hexachloro - 3,6 - methano - 1,2,3,6 - tetrahydrophthalic anhydride, a well known intermediate for preparing polyester and other resins as well as for curing epoxide resins. Unfortunately, this hexachloro compound has several shortcomings which has limited its use in certain resin applications. For example, the resins containing the cross-linked anhydride undergo photodecomposition in sunlight causing the resin to darken or discolor, thus making it unattractive for many outdoor uses or requiring the incorporation of costly ultra-violet screening agents in the resin. Since the photodecomposition has been shown to involve hydrogen chloride evolution, the replacement of the two α-hydrogen atoms with chlorine atoms appeared to be a desirable solution to the problem. However, the most logical preparation of the di-α-chlorinated anhydride, which formalistically would appear to be the Diels-Alder addition of hexachlorocyclopentadiene and dichloromaleic anhydride, would be expected on the basis of the prior art (see, for example, Ungnade and McBee, Chemical Reviews, 58, 254 (1958)), to be unworkable since hexachlorocyclopentadiene fails to undergo the Diels-Alder addition with olefins having two chlorines on each of the double bonds thereof (i.e., the —CCl=CCl— structure). The truth of this generalization has been established experimentally by the failure of the dichloromaleic anhydride to undergo the Diels-Alder addition reaction with hexachlorocyclopentadiene under even very vigorous conditions of time and temperature (up to two hundred and ten degrees for several days).

Quite surprisingly, it has been found that the present anhydride can be prepared by exhaustive chlorination of the aforementioned hexachlorinated anhydride. This finding is unexpected and surprising in view of the literature reports on products obtained through the exhaustive chlorination of other related dibasic anhydrides. For example, the chlorination of succinic anhydride (of which this product may be considered a substituted derivative), does not yield the α,α'-dichloro succinic anhydride corresponding to the applicant's product. Thus, since the most likely methods of preparing the present anhydride had been indicated by prior art generalizations and by laboratory experiment to be inapplicable to make the new composition, there was no apparent route to prepare the product and in view of the analogous prior art, the applicant's process of exhaustive chlorination of the anhydride was unexpected and unobvious.

The novel chlorination process described herein and in Serial No. 116,253 is unusal and advantageous in that the reaction conditions are not particularly critical. For example, the reaction may be run without a catalyst although actinic light provided through a conveniently sized mercury vapor or fluorescent light does speed the reaction and improve yield. Other appropriate catalysts include but are not limitd to activated carbon, phosphorus pentachloride or halides of the transition elements. No particular control of the chlorine feed is necessary as long as at least a stoichiometric amount of chlorine is used. No solvent is required, although a solvent inert to the reactants may be expeditiously used. Chlorine-resistant solvents such as chlorinated hydrocarbons may be used for example. The reaction may be run at pressures ranging from subatmospheric through atmospheric and superatmospheric pressures. The rate of reaction increases with chlorine pressure. The reaction temperature for the chlorination is not critical, ranging from about the boiling point of liquid chlorine up to two hundred degrees centigrade, the latter temperature being the highest operable temperature since it represents the decomposition temperature of the product.

The process is preferably performed as follows. The starting material is completely or partly dissolved in an inert solvent such as carbon tetrachloride and exposed to a direct source of actinic light. The mixture of anhydride and solvent is stirred and chlorine gas is passed into the solution. After the theoretical weight increase has occurred or the theroetical amount of hydrogen chloride has been evolved, the chlorination is stopped and the solvent partially removed by evaporation. The octachlorinated product crystallizes from solution as a white crystalline solid melting with decomposition at two hundred to two hundred and ten degrees. A precise melting point is somewhat dependent on the rate of heating. The correct structure for the product is proved by analysis for total chlorine, infra-red analysis which shows no C–H bonds and no double bonds other than the —CCl=CCl—, and the thermal decomposition to the known dichloromaleic anhydride plus hexachlorocyclopentadiene by the reverse Diels-Alder addition reaction.

In its composition aspects, this invention offers several important and unexpected advantages. The following are illustrative of some of the compounds which may be prepared using the described anhydride.

hundred to two hundred and ten degrees. The total chlorine content was found to be 64.1 percent, theoretical

| Reactant | Product |
|---|---|
| ROH (where R=methyl, other alkyl, aryl, heterocyclic radical). | 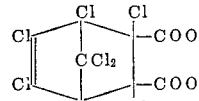 Half Ester and Ester |
| R¹R²NH (where R¹, R²=hydrogen, alkyl, aryl, or heterocyclic radical). | 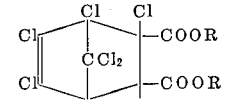 Amide and Imide (When R¹=H) |
| HO—A—OH (where A is a divalent organic radical). | 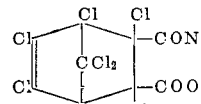 Polyester |

Another advantage of the inventive compositions is that they are herbicides effective against a variety of weeds including, but not limited to crabgrass, seedling Johnson grass and foxtail.

That these compositions are biologically active, much less herbicidally active, is most unexpected considering the biological inertness of their precursor, the 3,4,5,6,7,7-hexachloro-3,6 - methano-1,2,3,6 - tetrahydrophthalic anhydride or acid.

The rate of application cannot be precisely stated due to varying degree of resistance possessed by the weed species and crop, the stage of weed and crop growth, the soil type and climatic conditions, but, in general, the rates will be at least one-quarter of a pound of herbicide per acre and for reasons of cost will seldom exceed one hundred pounds per acre, with the preferred range falling within one-half to fifty pounds per acre. Where the weeds are in an early stage of growth, they being more susceptible, will frequently respond to the rates from one-half to four pounds per acre while older weeds or weeds that are to be totally eradicated from ornamental beds or turf may require rates in excess of four pounds per acre. In those instances where the weed population has been allowed to accumulate unchecked or where mature plants are encountered, applications of up to fifty and even beyond this rate may be required.

The following examples are intended to illustrate the workings of this invention, including such facets as the preparation of the herbicidal compositions, their formulation as herbicidal agents, and the testing results obtained using the formulation.

*Example 1*

Into a refluxing suspension of three hundred and seventy-one grams of 3,4,5,6,7,7-hexachloro-3,6-methano-1,2,3,6-tetrahydrophthalic anhydride in five hundred milliliters of carbon tetrachloride was introduced a stream of chlorine gas, while illuminating the mixture by means of a two hundred and fifty-watt mercury vapor lamp located in a pyrex glass well extending into the reaction vessel. Over the course of twelve hours, two molar equivalents of hydrogen chloride were evolved. The clear yellow solution was freed of chlorine by purging with nitrogen, then partially evaporated, diluted with heptane, and cooled, depositing thereby three hundred and sixty-six grams of crystalline product.

The product, crystallized from heptane, melted at two hundred to two hundred and ten degrees. The total chlorine content was found to be 64.1 percent, theoretical for $C_9Cl_8O_3$ being 64.5 percent. The neutralization equivalent in methanolic solution was four hundred and forty (milligrams per milliequivalent), (theory four hundred and forty, with formation of the monomethyl ester of $C_9Cl_8O_4H_2$) and in aqueous acetone was two hundred and twenty (theory two hundred and twenty, with formation of the dibasic acid $C_9Cl_8O_4H_2$).

The product, when heated for one-half hour at two hundred and five to two hundred and ten degrees, was converted to a melt which by infra-red analysis was shown to contain thirty-two plus or minus three percent hexachlorocyclopentadiene, fifteen plus or minus five percent dichloromaleic anhydride, and the remainder undecomposed starting material.

*Example 2*

This example illustrates the use of octachloro-3,6-methano-1,2,3,6-tetrahydrophthalic anhydride as a chemical intermediate for the preparation of a product having utility as a herbicide. A solution of 8.8 grams of the anhydride and 2.92 grams of diethylamine in fifty milliliters of ethyl ether was allowed to stand forty-eight hours and filtered, yielding 10.3 grams of diethylammonium N, N - di-ethyl-1,2,3,4,5,6,7,7-octachloro-3,6-methano-1,2,3,6-tetrahydrophthalamate; 4.6 percent N found, 5.0 percent N theoretical; 49.5 percent Cl found, 50.6 percent theoretical.

*Example 3.—Octachloro-3,6-methano-1,2,3,6-tetrahydrophthalimide*

Into 17.6 grams of octachloro-3,6-methano-1,2,3,6-tetrahydrophthalic anhydride dissolved in two hundred cc. of chlorobenzene was passed a stream of dry ammonia gas for twenty-five minutes. The ammonium salt of the amic acid precipitated. The mixture was then boiled for one hour under reflux, filtered with activated charcoal, and the filtrate evaporated to dryness with reduced pressure. The residue was recrystallized from aqueous acetone to obtain a colorless solid, melting point two hundred and fifty to two hundred and fifty-two degrees (with decomposition).

*Analysis.*—Calculated for $C_9H_3Cl_6O_2N$: N—3.8 percent. Found: N—3.6 percent.

*Example 4.—Methyl octachloro-3,6-methano-1,2,3,6-tetrahydrophthalate*

Octachloro-3,6-methano-1,2,3,6-tetrahydrophthalic anhydride (8.8 grams) was stirred and warmed until solution was complete in 50 milliliters of methanol. Then, the solution was immediately evaporated to dryness to obtain a colorless solid having a neutralization equivalent (by titration with 0.1 N sodium hydroxide solution) of 472, which is correct for the monomethyl ester of octachloro - 3,6-methano-1,2,3,6-tetrahydrophthalic acid. Continued refluxing of the above-described methanolic solution for one week followed by evaporation to dryness yields the dimethyl ester of the same acid.

Example 5

In a similar manner to example 2 were prepared the N,N - diisopropyloctachloro - 3,6-methano-1,2,3,6-tetrahydrophthalamic acid (a white solid) and its diisopropylamine salt (a white solid), the N,N-di(2-ethylhexyl) octachloro - 3,6 - methano-1,2,3,6-tetrahydrophthalamic acid (a colorless syrup), and its di(2-ethylhexyl) amine salt (a brownish syrup).

Example 6

The anhydride of Example 1 was applied at the rate of eight pounds per acre to an area seeded with snap beans, cotton, and foxtail (Setaria spp.). After ten days, when the dictoyledenous species had successfully germinated without apparent chemical injury, only a few severely stunted foxtail were found. A control area not treated with the chemical contained a heavy stand of foxtail.

Similar results were obtained using the acid, the imide or the monomethyl ester of the parent acid in place of the anhydride.

Example 7

An area seeded with crabgrass, Johnson grass, and quackgrass as representative grassy weeds, and soybeans as a representative crop of a commonly herbicide-sensitive type, was sprayed with an aqueous acetone solution of the acid at sixteen pounds per acre. The weedy grasses were almost completely prevented from sprouting while the soybeans sprouted normally.

Example 8

An area seeded with cotton, snapbeans, barley, and wheat, and infested with yellow and green foxtail was divided into plots and sprayed (before seedling emergence) at the rate of 8 pounds of chemical per acre with various of the compounds of the invention. One month later, the treated plots were inspected and the herbicidal effects were rated on the customary scale of 0 to 10 (0=no effects, 10=complete kill):

| Compound | Cotton | Beans | Barley | Wheat | Foxtail |
|---|---|---|---|---|---|
| 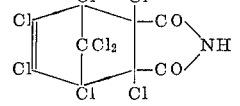 | 0 | 0 | 0 | 0 | 9–10 |
| 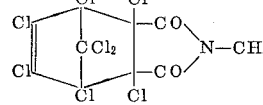 | 7 | 0 | 0 | 0 | 10 |
| 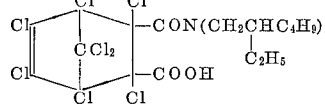 (applied as $NH_4$ salt in water) | 0 | 0 | 0 | 0 | 3–4 |
| 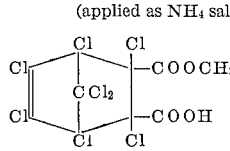 | 0 | 0 | 0 | 0 | 5 |

Thus, a good degree of crop selectivity was evidenced.

Example 9

A solution of 1 percent of various compounds of the invention is diesel oil were prepared and sprayed at 100 gallons per acre onto a mixed weed population including plantain, dandelion and goldenrod. In three days, the degree of weed destruction was recorded on the customary scale of 0 to 10, with the following results:

| Compound | Weed Injury |
|---|---|
| None (kerosene alone) | 3 |
| 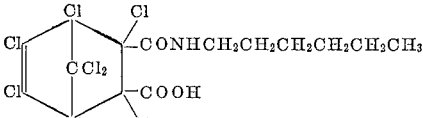 | 9 |
| 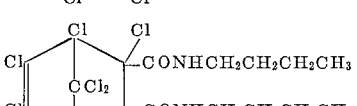 | 9 |
| 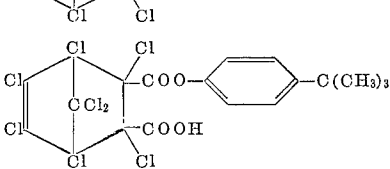 | 7 |

The invention has been described with respect to illustrations thereof but clearly, it is not intended to be so limited. The scope of the invention is measured by the claims and reasonable equivalents thereof.

What is claimed is:

1. 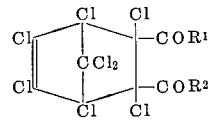

wherein $R^1$ and $R^2$, which may be the same or different, are selected from the group consisting of hydroxy, amino, alkoxy, phenoxy, lower alkylphenoxy wherein the alkyl is of 1 to 4 carbon atoms alkylamino and dialkylamino, providing that no more than one of $R^1$ and $R^2$, may be hydroxyl, and $R^1$ and $R^2$, when conjoined to form a ring, are selected from the group consisting of imino and alkylimino, said alkyl groups being of 1 to 8 carbon atoms.

2. A compound according to claim 1 wherein $R^1$ is lower alkoxy and $R^2$ is hydroxy.

3. A compound according to claim 1 wherein $R^1$ and $R^2$ are lower alkoxy.

4. A compound according to claim 1 wherein $R^1$ is lower dialkylamino and $R^2$ is hydroxy.

5. A compound according to claim 1 wherein $R^1$ and $R^2$ are lower dialkylamino.

6. A compound according to claim 1 wherein $R^1$ and $R^2$ are conjoined as lower alkylamino.

7.

8.

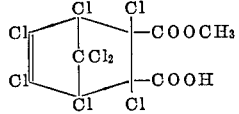

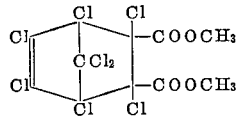

9.

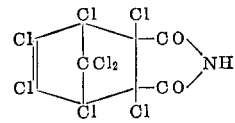

10.

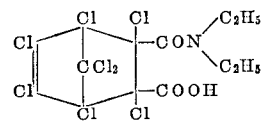

11.

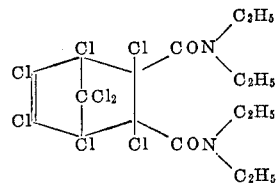

References Cited by the Examiner
UNITED STATES PATENTS

| | | | |
|---|---|---|---|
| 2,314,846 | 3/1943 | McClellan et al. | 260—468 |
| 2,771,423 | 11/1956 | Dorinson | 260—468 |
| 2,779,769 | 1/1957 | Robitschek et al. | 260—75 |
| 2,795,589 | 6/1957 | Bluestone | 260—326 |

ALEX MAZEL, *Primary Examiner.*

HENRY R. JILES, *Examiner.*

M. U. O'BRIEN, *Assistant Examiner.*